June 4, 1968  R. DEFLANDRE  3,386,146
MILLING AND BORING MACHINE HAVING A ROTARY TAILSTOCK
Filed Oct. 23, 1965  10 Sheets-Sheet 2

June 4, 1968  R. DEFLANDRE  3,386,146
MILLING AND BORING MACHINE HAVING A ROTARY TAILSTOCK
Filed Oct. 23, 1965  10 Sheets-Sheet 4

June 4, 1968 R. DEFLANDRE 3,386,146
MILLING AND BORING MACHINE HAVING A ROTARY TAILSTOCK
Filed Oct. 23, 1965 10 Sheets-Sheet 7

June 4, 1968 R. DEFLANDRE 3,386,146
MILLING AND BORING MACHINE HAVING A ROTARY TAILSTOCK
Filed Oct. 23, 1965 10 Sheets-Sheet 9

United States Patent Office 3,386,146
Patented June 4, 1968

3,386,146
MILLING AND BORING MACHINE HAVING A ROTARY TAILSTOCK
René Deflandre, Paris, France, assignor to Societe Derefa, Etablissement Pour le Developpement, Recherches et Fabrications Industrielles, Vaduz, Liechtenstein
Filed Oct. 23, 1965, Ser. No. 502,935
Claims priority, application France, Nov. 5, 1964, 993,890
8 Claims. (Cl. 29—26)

ABSTRACT OF THE DISCLOSURE

This device is concerned with a horizontal milling and boring machine in which the headstock is in the shape of a cylindrical body that is adapted to rotate coaxially with the tool-carrying spindle of the machine in a support which is vertically movable on an upright.

---

The present invention relates to milling and boring machines in general and more particularly, although not exclusively, to those of which the headstock may be moved longitudinally along the axis of the spindle.

Machining of parts of large diameter and reduced height or length is frequently effected on a combined machine comprising conventional milling and boring means and a face plate rotatable about a horizontal axis.

This arrangement permits all the operations of circular milling and division to be carried out by using tools or machining heads fixed to the milling and boring machine.

This modern method of operation is being more and more developed because it considerably reduces the times taken for operation whilst avoiding numerous operations of positioning of the parts or the tools, these operations being inevitable with conventional methods and with a workpiece which would for example be fixed only on operational bed-plates.

It is preferred to a similar method which consists in using a face plate having a vertical axis of rotation, in that case where the machining operation to be effected on the horizontal surface of the part are not only on the periphery but also towards the centre of the latter. In this case, it is necessary to use a headstock having a vertical axis, fixed to a large arm permitting the proposed operations to be achieved. This type of machine, which is more complex, is less currently in use and is more costly.

However, when workpieces of large diameter are also of great length and weight, this being the case in particular in the construction of interplanetary missiles or in the atomic industry, it becomes very difficult to apply one or the other method.

In fact, in the first case, heavy and long workpieces create an inadmissable overhang beyond a face plate rotating about a horizontal axis. In the second case, the great length of the workpiece if positioned vertically, necessitates a very high machine in order to have access to its upper face, or it is necessary that the face plate be sunk into the machine to a considerable depth, which is a difficult and not very practical solution.

It is an object of the invention to produce a milling and boring machine which, whilst retaining the advantages of this type of machine, eliminates or minimises, without using an auxiliary face plate, all the difficulties encountered in the two above mentioned methods and permits all the types of circular workpieces of large diameter to be machined with no limitation as to length, weight or the number, type and position of the machining operation to be carried out, amongst which mention may be made of circular milling, dividing operations and oblique machining in the vertical plane.

To this end, according to a main feature of the invention, the tailstock is constituted by two deeply ribbed parts: a cylindrical body rotating within a long support provided with slides, guides or bed-ways, about an axis which coincides with the axis of the main spindle.

This assembly which constitutes this spindle-holding headstock, may advantageously move longitudinally on a base plate of conventional type, itself provided with a vertical movement on the upright of the milling and boring machine.

In a preferred embodiment, the cylindrical body contains the machining spindles as well as the means for rotating and moving them axially, including the electrical control motors, but one part of these means—the electrical motors and their gear-boxes for example—could also be placed on the tail support by connecting them with the members located on the cylindrical body by suitable dividing equipment.

In one embodiment, the means of rotation, clamping, automatic division at any optical observation angle, and locking in angular position, comprise elements carried by the cylindrical body and elements carried by the tail support.

The speed of rotation extends over a large range which enables at its minimum value, extremely fine adjustments to be obtained as well as angular automatic stopping by means of a contact box.

In the above mentioned case where electrical apparatus and motors are installed in the rotary cylindrical body, it is necessary to provide an electrical contact permitting this rotation. To this end, according to another feature of the invention, a drum is provided on the cylindrical body for paying out the connecting cable. Knowing that for circular milling, it is necesary to effect only a little more than one turn, the diameter of the drum and the length of the cable will be dimensioned so that the cable may be wound over one and a half turns for example.

If this were necessary, in certain special cases, as for example producing a spiral, it would naturally be possible to provide a larger number of turns, by increasing to the same extent the number of winding turns of the cable, either on itself, or for high values, on a drum of large diameter comprising a semi-circular, helically machined supporting groove as made in conventional cable winders.

The rotary tailstock may also carry out large diameter turning operations. In order to do this, it is sufficient that the rotary drive power which is normally installed is suitable for the desired value. The electrical supply relating to the rotary action must then permit an unlimited number of turns and to this end the device for winding the cable is completed by a conventional friction device serving uniquely for controlling the turning operations, the rest of the contacts which are especially for the circular millings, being collected on a current-collector which is disconnected during the turning operations.

The milling and boring machine according to the invention comprises means for advancing, controlling and locking the tail support, which means are placed partly on the latter and partly on the base plate.

According to another feature of the invention, the cylindrical body is extendable in a forward direction by a member of parallelogram shape so that a complementary member of the machine may be mounted on the front face or on one or two parallel lateral faces opposite said parallelogram member. In fact, for certain machining operations, it is necessary to have a tool-holding spindle which is radially shiftable with respect to the axis of rotation of the headstock and mounted on a support provided with an automatic radial advance.

In an embodiment of the invention, the above mentioned support of the complementary spindle receives its advance movement and the rotational control from a drive take-off conveniently located on the headstock, in the path of the drive means for rotating and advancing the main spindle.

A plurality of complementary spindle supports of different types permitting milling, boring, tapping or grinding, may be mounted on the parallelogram member in front of the headstock. In a particular embodiment, they may all be mounted on the same radial advance support.

Where more than two spindle carriers would be necessary simultaneously for a particular machining operation, a larger number of lateral supporting faces could be provided on the front part of the headstock or a plate of large diameter could even be fixed to the front face of the latter, this plate carrying the necessary number of spindle carriers. In the latter case, the rotational control would be constituted by the main spindle and the advance control by the shaft output normally provided on the front face of the headstock for controlling the face plate of conventional type.

In the preceding description, the use of spindle carriers as well as means for effecting circular machinings or division, has been referred to. However, they are still very useful in cases of conventional machining where the vertical or horizontal path of the machine would be shown to be insufficient. The use of spindle carriers in fact increases the vertical capacity of the machine, towards the top and bottom, in a proportion estimated at abou 50%. Although it is less important proportionally, the horizontal increase may also be useful in certain extreme cases.

In order that the invention may be more clearly understood, reference will now be made to the accompanying drawings which show, by way of limiting example, one embodiment thereof, and in which.

Referring firstly to FIGURES 1 to 6 of the drawings, a milling and boring machine according to the invention is schematically shown therein in elevation. It comprises conventional elements such as a table 1 on which a base 2 is horizontally movable to which base an upright 3 is bolted. A base plate 4 is displaced vertically on the latter. A tail support 5 (see in particular FIGURE 5) is supported on the base plate by means of slides or guides 6 and 7 (FIGURE 6), an adjusting wedge 8 and clips 9 and 10. The main particularity of the machine according to the invention resides in the cylindrical body 11 which rotates in the tail support on bearings 12 and 13, the axis of rotation being the same as that of the main milling spindle 14 and boring spindle 15 sliding in the preceding one (see FIGURE 5). In the conventional use of the machine, the milling, boring, piercing and tapping tools are carried by these spindles or even by one spindle 16 at high speed, the part is fixed to the bed plate 17.

The cylindrical body 11 terminates at the front in a parallelogram-shaped member part 41. In the use of the machine according to the invention and referring to FIGURES 12 and 13, it may be seen that on the lateral face 18 of the parallelogram extension in front of the cylindrical body 11, has been mounted a U-shaped support 19 in which a slide block 20 is moved, which supports a spindle carrier 21 on which is mounted a milling cutter 22. A workpiece 23 of large diameter and length has been fixed on the bed-plate and its circular face 24 is machined by the milling cutter during the rotation of the cylindrical body.

Figure 16:
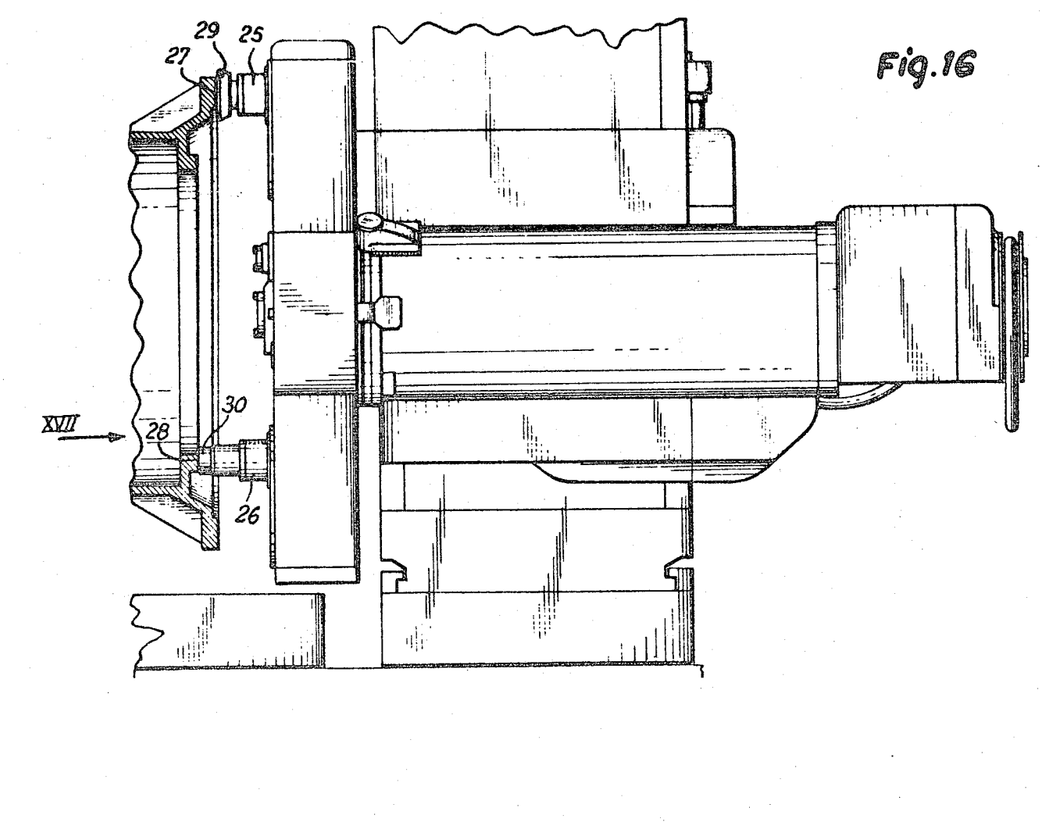
FIGURE 16 shows a schematic elevational view of the machine according to the invention for a second case of machining.
Figure 17:
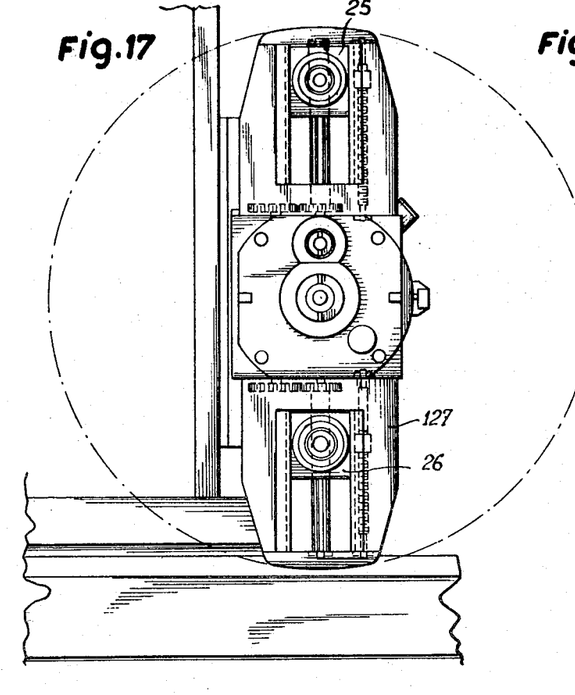
FIGURE 17 shows side view of FIGURE 16 along the line XVII thereof.

In a second case of machining shown in FIGURES 16 and 17, this time use is made of two spindle carriers 25 and 26 mounted on two supporting devices identical to that preceding. It is then possible simultaneously to effect two different circular machining operations 27 and 28 with two milling cutters 29 and 30.

Figure 18:
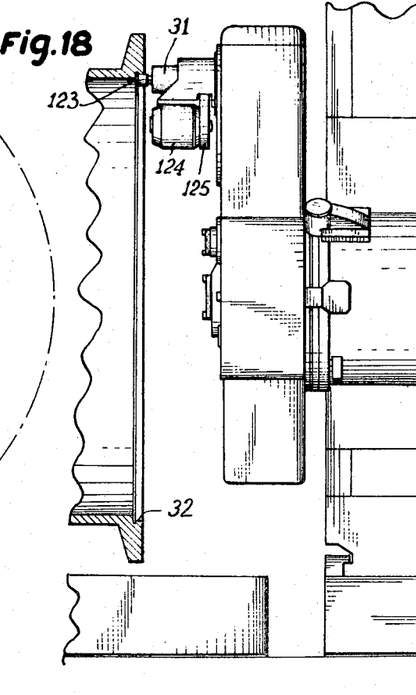
FIGURE 18 shows a schematic elevational view of the machine according to the invention for a third case of machining.

In a third case of machining, illustrated in FIGURE 18, use is made of a grinding spindle carrier 31 mounted in the same support and permitting an internal centring 32 to be effected.

Returning now to FIGURES 3, 5, 6 and 11, a more complete description of the production means of the invention will be given.

Figure 5:
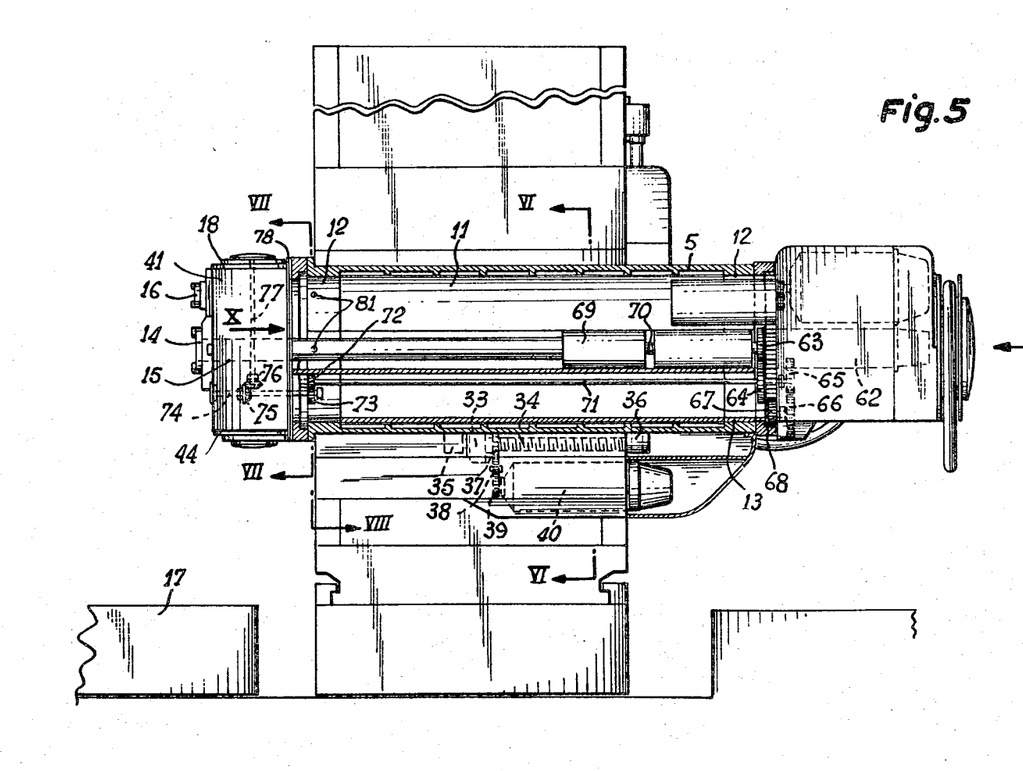
FIGURE 5 shows a partial vertical section, made only in the tail support, along the line V—V of FIGURE 3.
Figure 6:
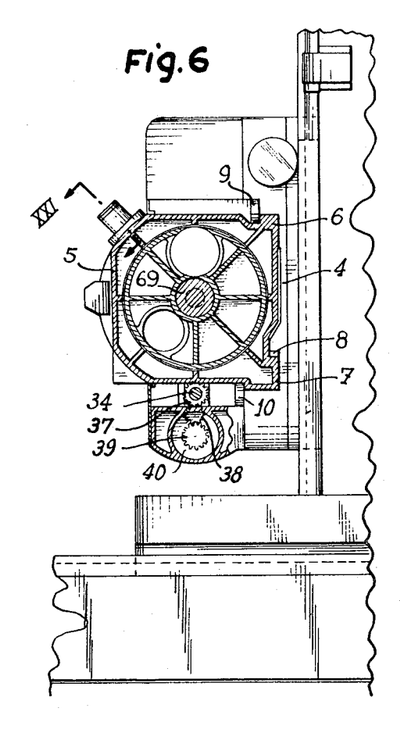
FIGURE 6 shows a partial vertical section, made in the cylindrical body, the tail support and the low portion of the base plate along the line VI—VI of FIGURE 5.
Figure 7:
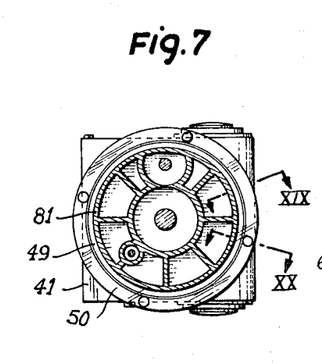
FIGURE 7 shows a section through the cylindrical body along the line VII—VII of FIGURE 5.
Figures 9, 10, 11:
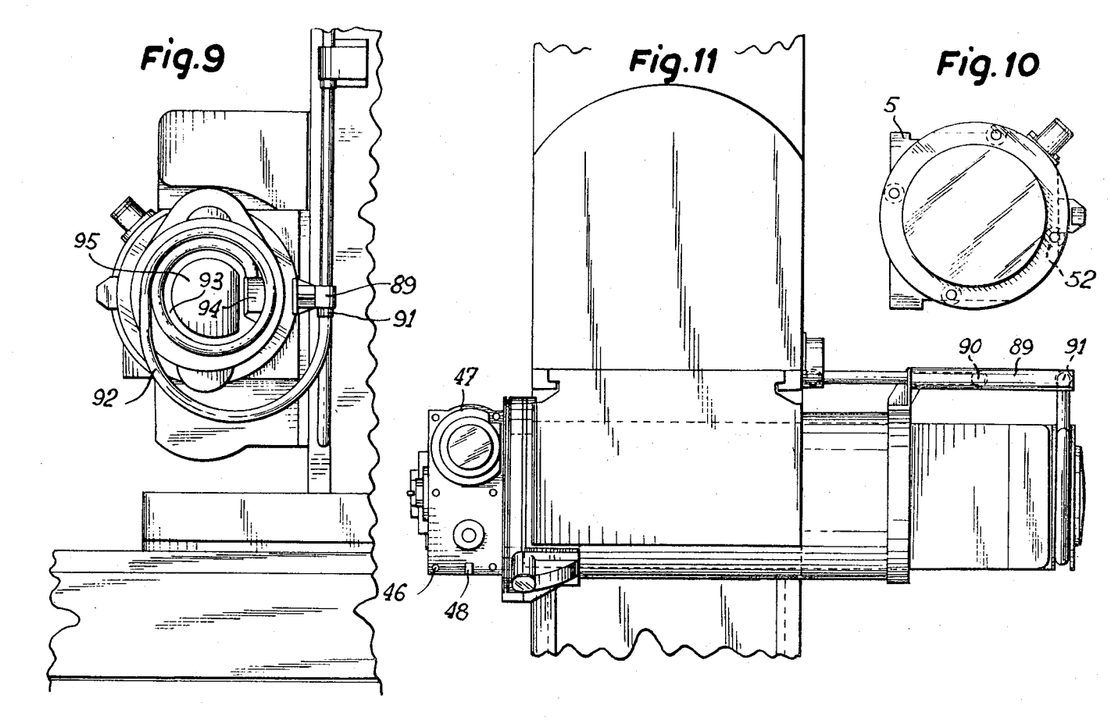
FIGURE 9 shows a view identical to FIGURE 6 after the rear covers have been removed.
FIGURE 10 shows a side view of the tail support in the direction of the arrow X of FIGURE 3.
FIGURE 11 shows a plan view of FIGURE 5.

The displacement of the tail support 5 on the base plate 4 is obtained by a rotary nut 33 fixed to the latter and a screw 34 fixed to the tail support 5 by bearings 35 and 36. The rotary nut is driven by pinions 37, 38, 39 and a variable speed motor reducer 40.

The cylindrical body 11 comprises in the front as indicated above, a parallelogram member 41 whose front part is provided with four threaded holes 42 and two keys 43 (FIGURE 3) for fixing auxiliary heads. At least two parallel side faces 44 and 18 (see FIGURE 5) also serve to fix auxiliary heads by means of threaded holes 46, the centring 47 and key 48 (see FIGURE 11).

Figure 19:
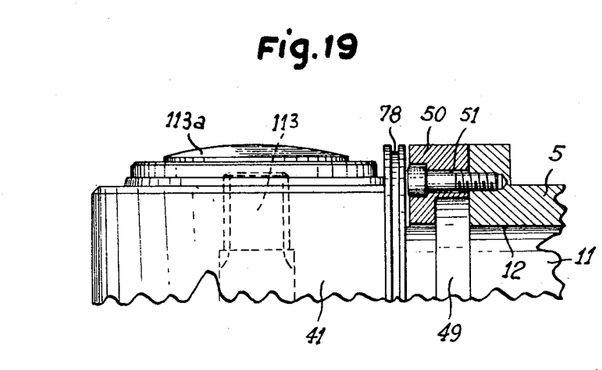
FIGURE 19 shows to a larger scale, a partial section along the line XIX of FIGURE 7.

FIGURE 19 shows that between the parallelogram member 41 and bearing 12 is placed a wide flange 49 which is localised in length by the corresponding face of the tail support 5 and a circular clip 50 fixed to the latter by means of screws 51. Moreover, a small gap, filled with grease or pressurised oil, permit a very smooth rotational operation of the cylindrical body.

Figure 20:
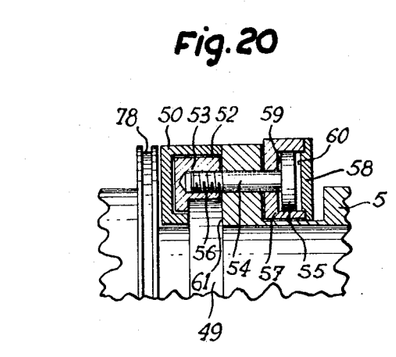
FIGURE 20 shows to a larger scale, a partial section along the line XX of FIGURE 7.

FIGURE 20 shows that the clip 50 has four grooves 52 (see FIGURE 10) in which shoes 53 are housed. The rod 54 which carries at one end a piston 55 is screwed by means of its thread 56 into the shoe 53. The piston is placed inside a cylinder 57 closed by a cover 58.

Oil, led through pipes and connections (not shown in the drawing), is conveyed under pressure alternately in the spaces 59 and 60 so as to tighten the rod 54 or to leave it free. The first manoeuvre causes the tightening of the supporting face 61 of the flange to the corresponding face of the support 5, thus the locking of the latter. The second brings about the unlocking.

Returning to FIGURES 5 and 8, it may be seen that the rotation of the cylindrical body 11 is controlled from a motor reducing unit 62 which, by means of the pinions 63, 64, 65 and 66 finally causes the pinion 67 to rotate on the internal ring 68. As this ring is fixed to the tail support 5 and the pinion 67 belongs to the cylindrical body 11, the result is that the latter effects a rotational movement on the former. The motor reducer 62 also controls the advance movement of the carriage 69 for longitudinally driving the spindle by means of the lead-screw 70 which is directly rotated.

Figure 8:
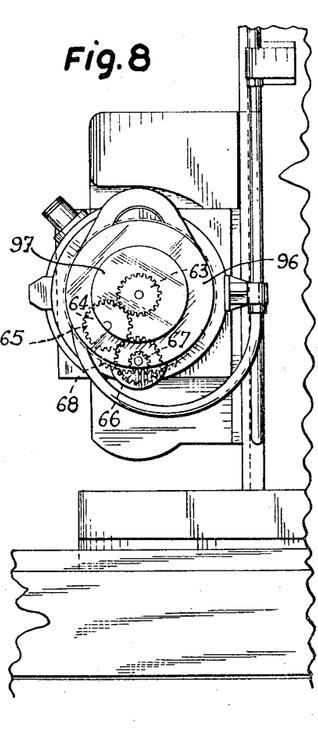
FIGURE 8 shows a side view in the direction of the arrow VIII of FIGURE 5.

It also controls a shaft 71 which traverses the whole of the cylindrical body and at one end carries a pinion 72 which engages on another pinion 73 integral with a shaft shown by its axis 24. Two bevel gears 75, 76 permit the shaft 77 to be rotated.

Figure 1:
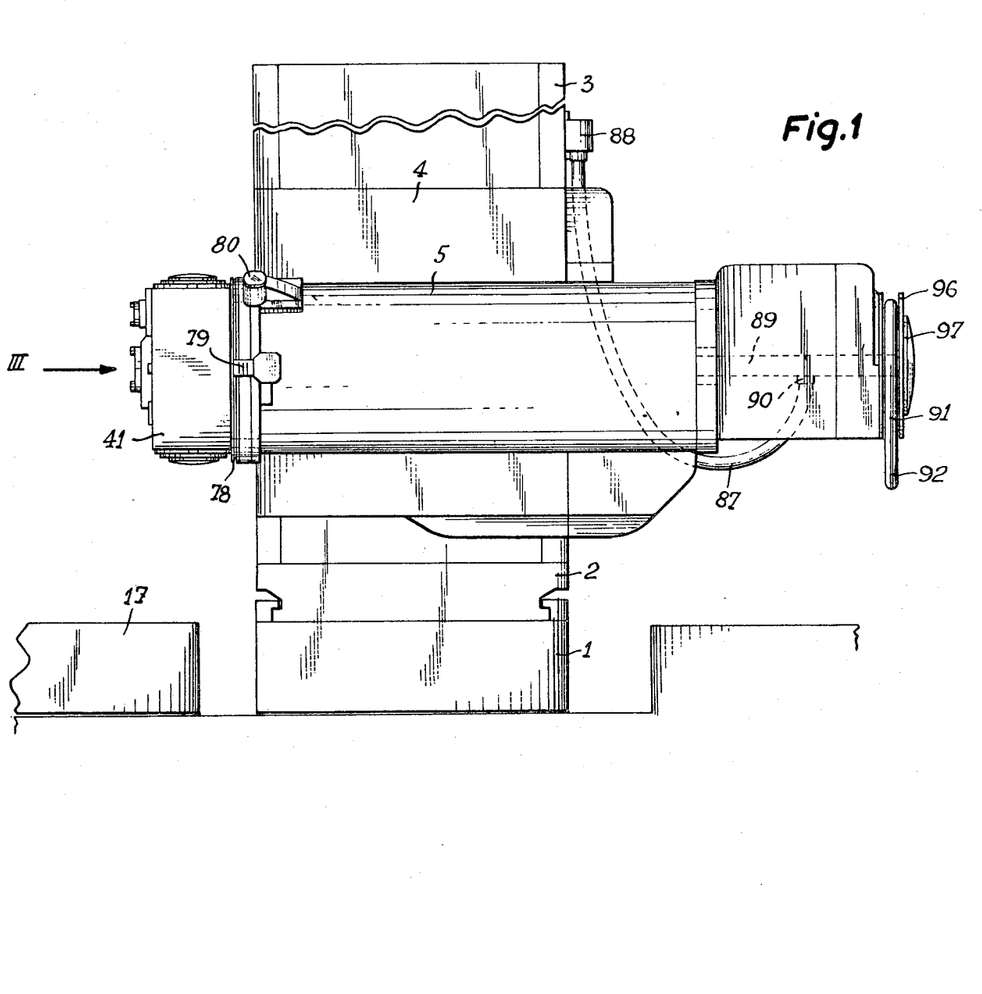
FIGURE 1 shows a schematic elevational view of a milling and boring machine of the type having a bed-plate, comprising a rotary tailstock according to the invention.
Figure 2:
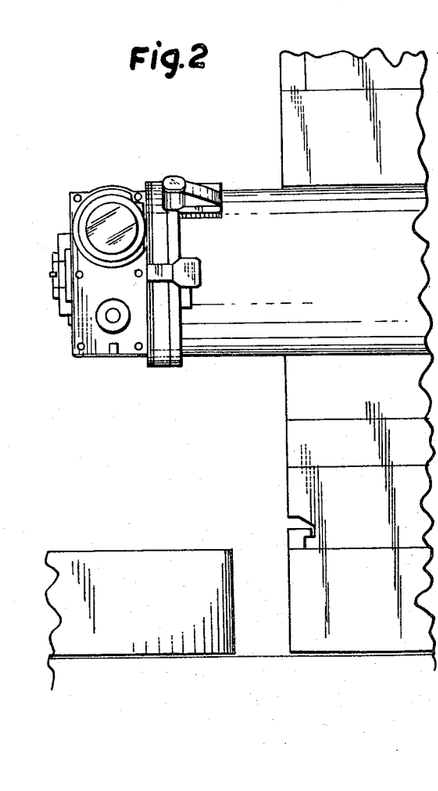
FIGURE 2 shows a partial view similar to FIGURE 1 but after the headstock has been rotated through 90°.
Figure 3:
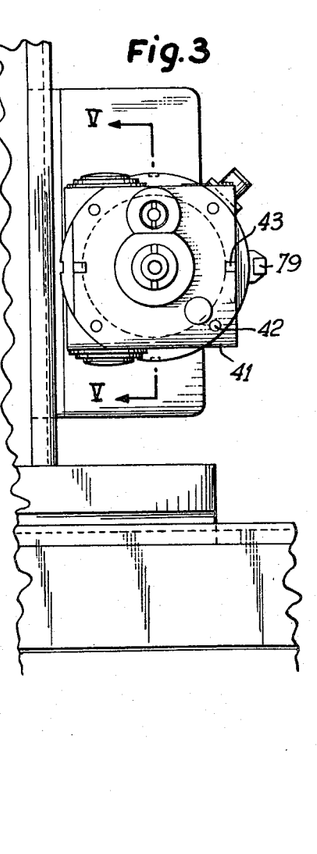
FIGURE 3 shows a side view of the headstock as seen from the direction of the arrow III of FIGURE 1.
Figure 4:
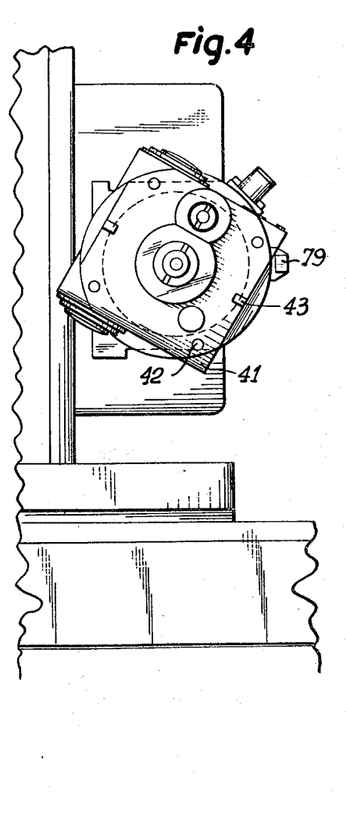
FIGURE 4 shows a view similar to FIGURE 3, but after the headstock has been rotated through a certain angle.

The ends of the shafts 74 and 77 serve to control the advance movements of the carriage on auxiliary heads or members, particularly the spindle-holding supports, fixed to the member 41 of the cylindrical body 11 of the headstock and the detailed description of which is as follows:

FIGURES 1, 3 and 19 show the automatic stopping device which is obtained by the action of press buttons fixed in a groove 78 in the cylindrical body on a contact box 79 (see FIGURE 3) fixed to the tail support. This box acts on the advance motor 62, stopping it within a very small angular tolerance, thus effecting a very precise positioning of the rotary member.

Figure 21:
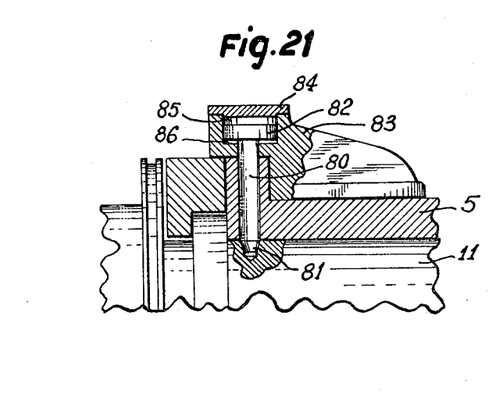
FIGURE 21 shows to a larger scale, a partial section along the line XXI of FIGURE 6.

Moreover, referring to FIGURES 1 and 21, it may be seen that the angular positioning at determined angles is ensured by a locking device 80 which is engaged in corresponding holes 81 of the cylindrical body 11. This locking device is centred with a very small operational clearance in a corresponding hole of the support 5. It is provided at its rear with a piston 82 which is moved into a cylinder 83 closed by a cover 84. Oil under pressure arrives on one or the other face of the piston in spaces 85 and 86 so as to lock or unlock the device 80.

An optical observation device could also be provided, by accurately attaching a graduated strip to the cylindrical part carrying the groove 78. An observation window (not shown in the drawing) fixed to the tail support 5, would enable these graduations to be read.

FIGURES 1, 8, 9 and 11 show the cable winding device which permits the motors and electrical apparatus placed on the cylindrical body 11 to be supplied with current. In the first case, the supply between the upright and the tail support is effected by a flexible sheath 87 located between the box 88 and a rigid conduit 89 fixed to said support (see FIGURE 1). The wires lead to the inside of the conduit in the space between the connections 90 and 91 and penetrate into a sheath 92 (see FIGURE 9) which effects 1½ turns about a drum 93 in order to abut at the junction box 94 fixed to said drum. The wires open out to the inside of the space 95 where the junction terminals (not shown in the drawing) are placed. The winder is closed at its front part by a cover 96 (see FIGURE 1) which serves as a lateral retention side for the sheath 92. The cover 96 is provided with a round hole giving access to the space 95, so as to permit accessibility to the terminals. It is closed by a cover 97.

One and a half turns of the winding permit a rotation of the cylindrical body which is slightly greater than one turn which is necessary and sufficient for all the machining operations by circular milling or division.

Figure 12:
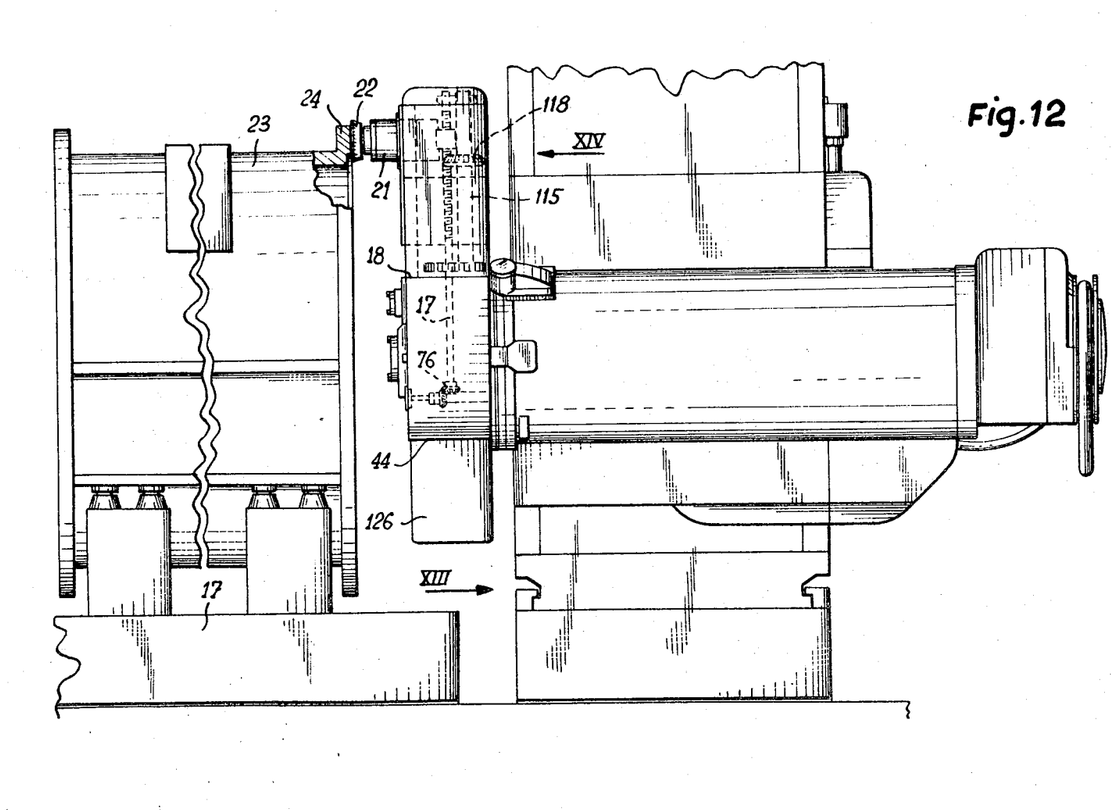
FIGURE 12 shows a schematic elevational view of the drilling and boring machine according to the invention in a first case of machining.
Figure 13:
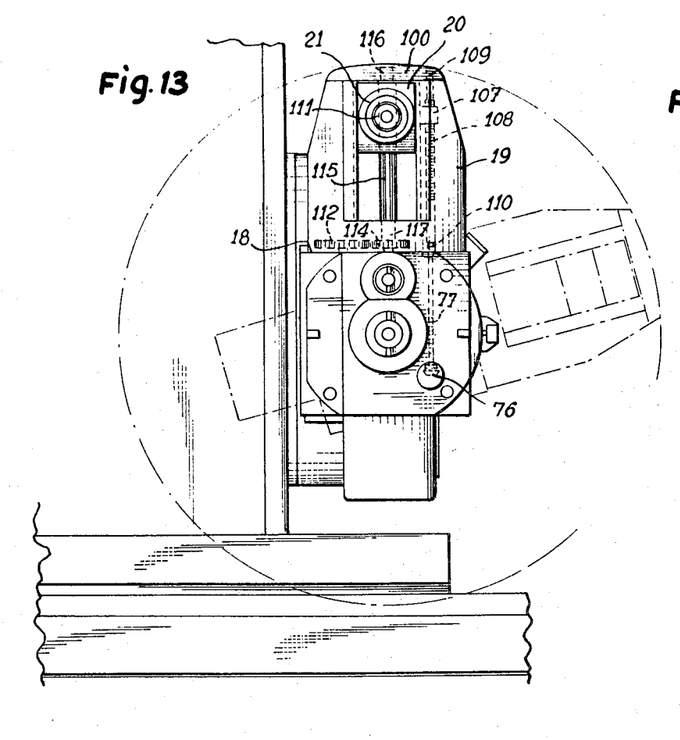
FIGURE 13 shows a side view as seen from the arrow XIII of FIGURE 12.
Figure 14:
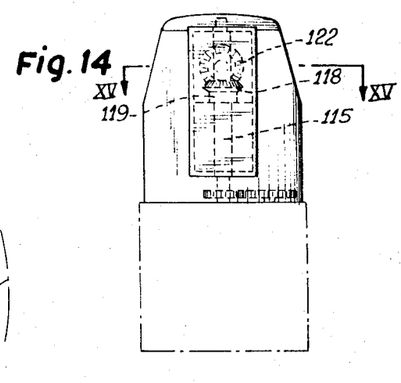
FIGURE 14 shows a side view of the spindle holding support as seen from the arrow XIV of FIGURE 12.

Referring now to FIGURES 12 to 15, the use of a spindle carrying support may be seen for the machining or circular milling of a part 23 having a large diameter and length, fixed to the operating bed plate 17 by conventional support and clamping means (see FIGURE 12).

The U-shaped body 19 closed at its upper part by a plate 100 (see FIGURE 13) is fixed to the rotary headstock by means of screws which are inserted in the threaded holes 46 (FIGURE 11). It comprises faces of guides 101, 102, 103, 104 and clips 105, 106 which ensure the guiding of a slide block 20 (see FIGURE 15). The radical drive of the slide block is obtained by a nut 107 which is integral therewith and in which a screw 108 rotates, said screw being fixed at its two ends in bearings 109, 110 (see FIGURE 13). Rotation is obtained by coupling the screw 108 to the shaft 77.

The rotational control of the pinion 111 is effected by a drive means comprising a pinion 112 fixed to a moving shaft 113 which is accessible after having dismounted a cover 113a (FIGURE 19). This pinion engages with a pinion 114 on the support 19 and which ensures the drive of the channelled shaft 115 which traverses the whole of the U-support and is held at its two ends in bearings 116 and 117 (see FIGURE 13).

A bevel gear 118 held in a bearing 119 integral with the slide block (see FIGURE 14) is displaced longitudinally along the channelled shaft.

Figure 15:
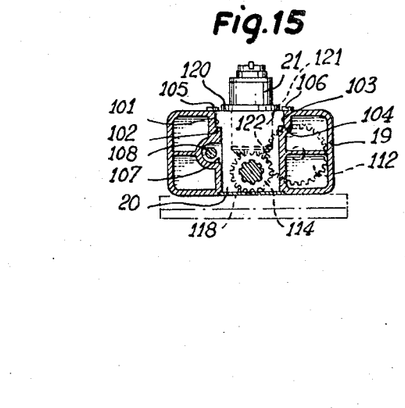
FIGURE 15 shows a part horizontal section taken along the line XV—XV of FIGURE 14.

The spindle carrier 21 is constituted by a cylindrical body, provided with a clip 120 (see FIGURE 15). The rear cylindrical part is machined to high precision and is adjusted in a corresponding bore 121 of the slide block. Screws and keys placed in the clip 120 and not shown in the drawing enable the spindle carrier to be fixed.

A bevel gear 122 which engages with the pinion 118 and ensures the rotation of the latter is placed at the rear end of the spindle 111.

As may be seen, this design enables spindle carriers to be mounted in the slide block, said carriers having different functions and their only common factor being the rear cylindrical part and the fixing clip.

FIGURE 18 shows a grinding spindle carrier 31 which, by means of a grinding machine 123, effects an internal centring 32. The spindle is driven by an independent motor 124 and a belt 125. The current supply to the motor is ensured by the cable 92 (FIGURE 1).

In the case of using one spindle carrier only, it may prove to be useful to fix a balance weight 126 on the second face 44 of the rotary headstock (see FIGURE 12).

This second face (FIGURES 16 and 17) may also serve to mount a second U-shaped support 127. The spindle carrier 26 permits a second circular milling operation 28 to be simultaneously effected with the milling cutter 30.

The different embodiments of the invention which have been described above with reference to the attached drawing, have been given only by way of examples. They could be given certain modifications of detail without altering the general economy of the invention. Thus the front parallelogram member 41 of the cylindrical body 11 could have a number of flat faces greater than in the embodiment shown for permitting the fixing of a larger number of auxiliary heads so as to be able to carry out a greater variety of machining operations as needed.

I claim:

1. A milling and boring machine having an upright, a headstock support vertically movable on said upright, a headstock having a horizontal cylindrical body rotatably mounted in said headstock support, a tool-carrying spindle rotatably mounted in said headstock coaxially to said cylindrical body, one end portion of said headstock protruding out of said headstock support and being in the shape of a rectilinear body having an end face and lateral faces, said tool-carrying spindle extending to said end face of said end portion, removable supporting means mounted on a lateral face of said end portion, an auxiliary rotary tool carrying spindle mounted in said removable supporting means, motor means, and transmission means between said motor means and said spindles.

2. A milling and boring machine as defined in claim 1, further comprising a slide which is mounted for vertical sliding movement on said upright, said headstock support being slidable horizontally on said slide.

3. A milling and boring machine as defined in claim 1, wherein said removable supporting means comprise a slide block which is radially displaceable with respect to said end portion, said auxiliary rotary tool-carrying spindle being mounted in said slide block.

4. A milling and boring machine as defined in claim 3, wherein said auxiliary spindle is parallel with said first named spindle.

5. A milling and boring machine as defined in claim 1, wherein said motor means are electric motor means arranged within said cylindrical body and wherein the other end portion of said headstock carries a device for winding one end of an electric cable adapted to energize said motor means from an outer source of supply.

6. A milling and boring machine as defined in claim 1, wherein said motor means are electric motor means arranged within said cylindrical body and wherein the other end portion of said headstock and the adjacent portion of said headstock support carry a brush and slipring device for connection of a suitable source of electric power to said electric motor means.

7. A milling and boring machine as defined in claim 1, further comprising driving means for rotating said headstock, said driving comprising a ring gear secured to said headstock support and a pinion in mesh with ring gear and operatively connected to said transmission means.

8. A milling and boring machine having an upright, a headstock support including a base plate vertically movable on said upright, a cylindrical horizontally disposed tail support, means supporting said tail support for longitudinal slidable movement on said base plate, a headstock having a horizontal cylindrical body concentric with and rotatably mounted in said tail support, a tool-carrying spindle coaxially and rotatably mounted in said headstock body, said cylindrical headstock body having a block-shaped end portion extending beyond one end of said tail support and having an end face disposed transversely to said spindle and lateral faces disposed in parallelism to the longitudinal axis of said spindle, said spindle extending to said end face of said block-shaped end portion, supporting means mounted on a lateral face of said block-shaped end portion, an auxiliary rotary tool carrying spindle mounted in said supporting means, motor means, and transmission means between said motor means and said spindles.

References Cited

UNITED STATES PATENTS

| | | | |
|---|---|---|---|
| 2,269,641 | 1/1942 | Woytych | 29—26 |
| 2,682,698 | 7/1954 | Berthiez | 29—40 |
| 2,831,386 | 4/1958 | Woytych | 29—26 |
| 1,791,758 | 2/1931 | Goetz et al. | 90—16 |
| 2,196,231 | 4/1940 | Ridgway | 90—16 |
| 2,307,222 | 1/1943 | Johnson | 90—17 |
| 2,685,122 | 8/1954 | Berthiez | 90—17 |
| 2,710,934 | 6/1955 | Senn | 90—16 |

GERALD A. DOST, *Primary Examiner.*